July 16, 1940.  C. B. MOORE  2,208,223
MEASURING AND CONTROL APPARATUS
Filed Feb. 12, 1938  2 Sheets-Sheet 1

INVENTOR.
COLEMAN B. MOORE
BY George M. Muschamp
ATTORNEY

July 16, 1940.     C. B. MOORE     2,208,223
MEASURING AND CONTROL APPARATUS
Filed Feb. 12, 1938     2 Sheets-Sheet 2
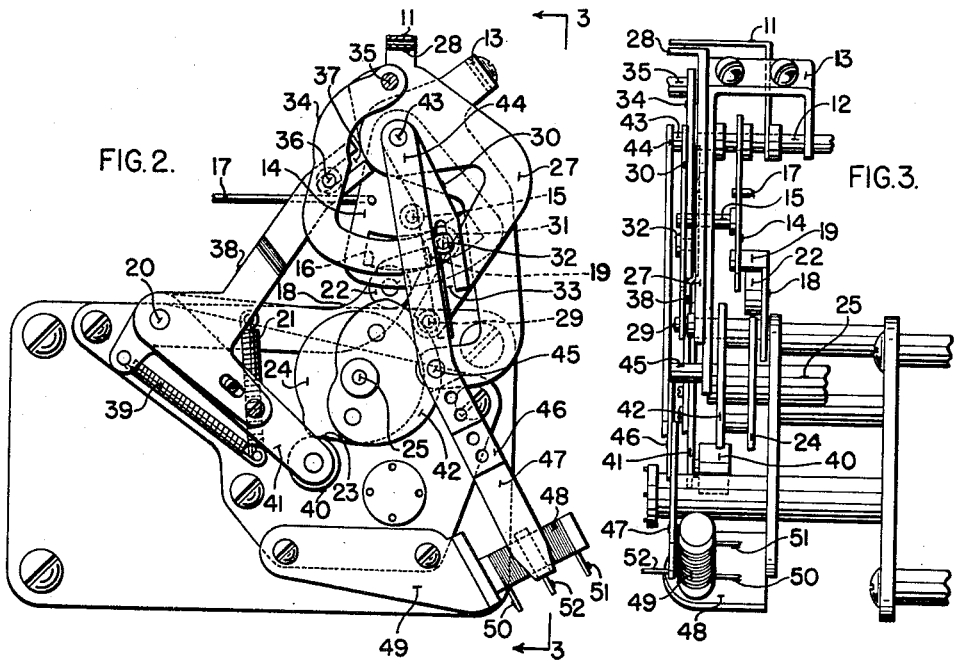
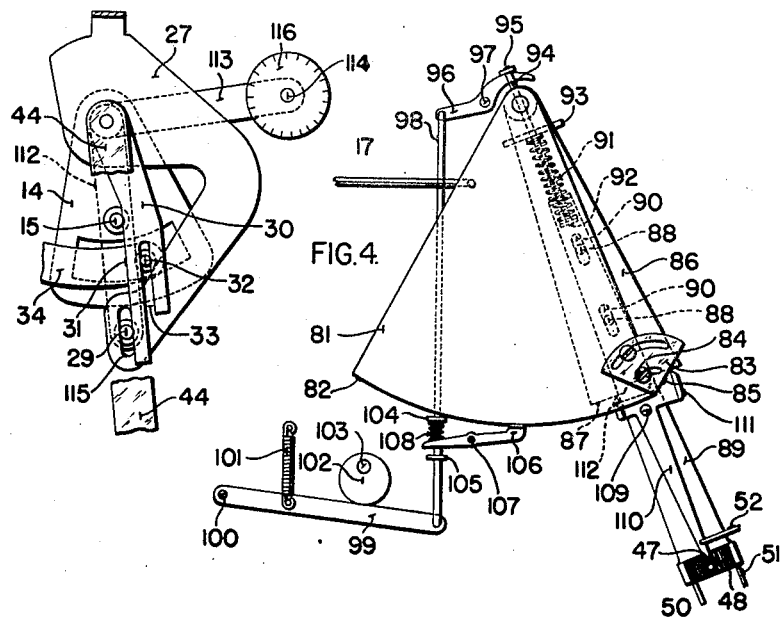
INVENTOR.
COLEMAN B. MOORE
BY George M. Muschamp
ATTORNEY Patented July 16, 1940

2,208,223

UNITED STATES PATENT OFFICE 2,208,223

MEASURING AND CONTROL APPARATUS

Coleman B. Moore, Carroll Park, Pa., assignor to The Brown Instrument Company, Philadelphia, Pa., a corporation of Pennsylvania Application February 12, 1938, Serial No. 190,160

11 Claims. (Cl. 236—74)

The general object of the present invention is to provide improvements in control instruments of the type including a measuring element deflecting in accordance with a measurable control quantity, and a relay mechanism or power device through which the deflection of said measuring element effects adjustments of a control switch or analogous control device which are not practically obtainable by direct action of the deflecting element on the control device. More specifically, the object of the present invention is to provide an instrument of the type mentioned, with mechanical relay provisions of novel construction, adapted to give a relatively wide range of adjustment to the control device, and to establish a relation between the movements of the deflecting element and control device, which is desirable in respect both to the magnitude and timing of said movements.

My improved instrument is adapted for a wide range of uses. Its deflecting element may respond to, and by its deflections furnish a measure of, changes in pressure, temperature, electromotive force, or any other physical condition, which, by its changes gives rise to variations in a measureable force, desirably resulting in control actions selectively dependent on such variations.

In control instruments it is necessary to measure the condition that is to be controlled, and actuate some control mechanism in response to the measurement to bring the value of the condition back to normal if it has deviated therefrom. Quite often the primary measuring element does not have sufficient power to properly adjust the control mechanism in response to movements of said element. In such cases it is necessary to provide a booster or relay mechanism between the measuring element and the control mechanism in order to provide the necessary power amplification for the measuring element to adjust the control mechanism. It is specifically an object of my invention to provide a mechanical relay which will supply the power that is necessary to accurately position the control mechanism of an instrument in response to changes in the position of a member that is moved by the measuring element. By the use of such a relay the measuring element can also be made more sensitive than would be the case if it had the additional function of actuating the control.

In the preferred forms of embodiment of my invention hereinafter described by way of illustration, an electric motor is used to drive a chart upon which a record of the condition being measured and controlled is made. This same motor is also used to drive the mechanical relay which periodically sets the control arm of a so-called "proportioning system," which in turn controls the condition being measured. The control arm moves in accordance with the relative then value of the condition and the desired value of the condition.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 2 is a view of the mechanical relay of Fig. 1 with the various parts in different positions;

Fig. 3 is a view on line 3—3 of Fig. 2;

Fig 3A is a view of a modification; and

Fig. 4 is a view of a modified form of relay mechanism.

Figure 1:
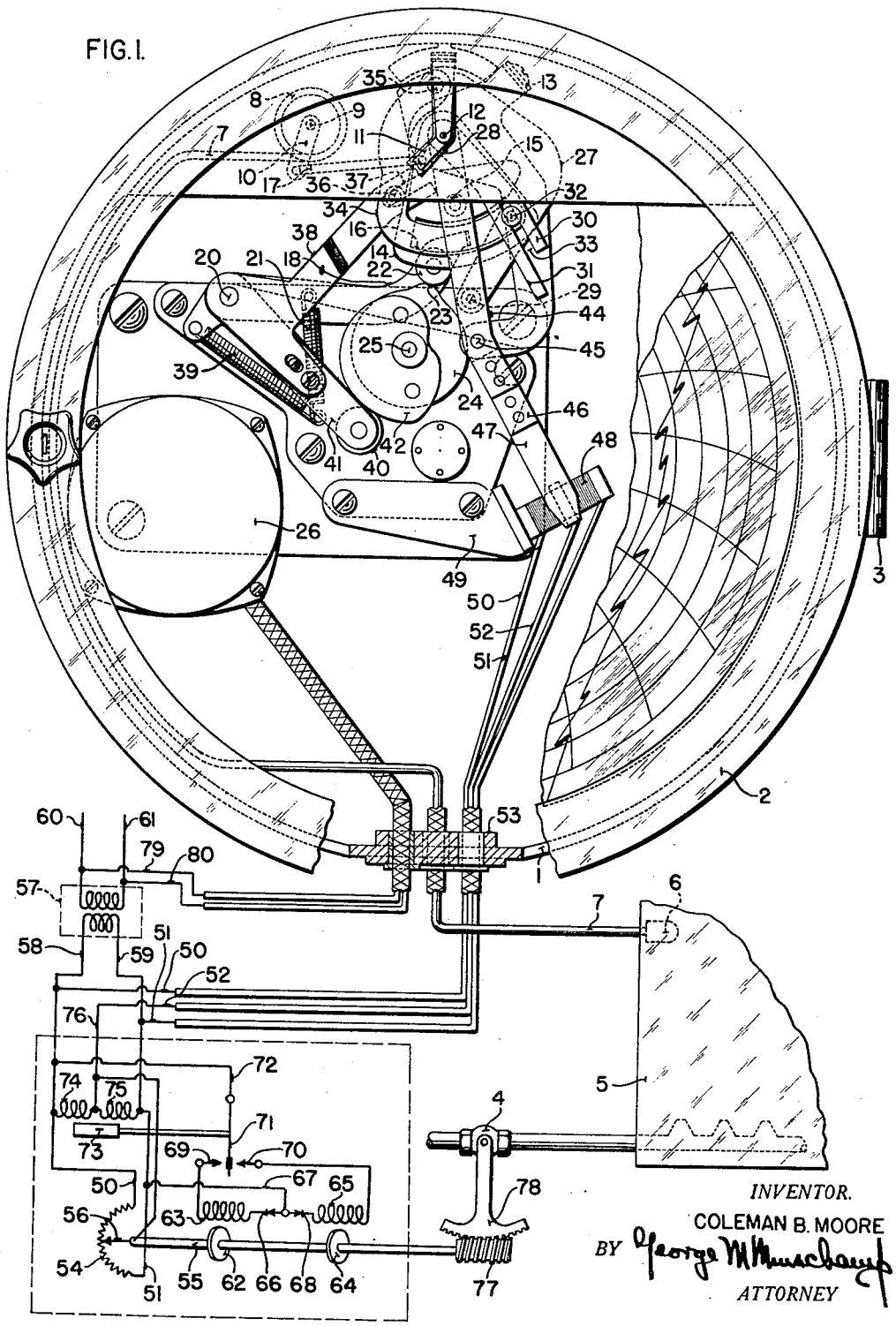
Fig. 1 is a view including an elevation of a control instrument with parts broken away and including a diagrammatic representation of furnace control provisions external to the instrument and cooperating with the instrument to maintain predetermined temperature conditions.

In the embodiment of the invention shown in Figs. 1, 2, and 3, my improved control instrument comprises mechanism located in an instrument casing 1, which may be of conventional instrument casing size and form, and includes a front door 2, with a hinge connection 3 between the door and casing body, said instrument being employed to adjust the fluid fuel supply valve 4 of a furnace or heater 5, as required to maintain a predetermined furnace temperature to which the device 6 is responsive. As shown, the device 6 is the bulb of a fluid pressure thermometer, the pressure in which is transmitted by a tube 7 to the stationary end of a Bourdon tube helix 8 forming a part of the instrument mechanism. The free end of the helix 8 gives angular movements about a shaft 9, coaxial with the helix, to a crank arm 10, as the thermometer pressure increases and decreases. The angular movements of the arm 10 oscillate a pen arm 11 about its stationary pivotal support 12, which consists of a shaft that is rotatable in a yoke 13 that forms part of the framework in the casing 1. Fastened to the shaft 12 and movable therewith is a plate member 14 which has a pin 15 projecting therefrom and has a cut-out portion, one edge of which forms a brake surface 16. The crank arm 10 is connected by a link 17 to the plate 14 to thereby impart the movements of the helix, in accordance with changes in the temperature to which the bulb 6 is subjected, to the pen 11 and the plate 14. A brake-member 18 having a turned-in edge 19 that engages brake surface 16 is pivoted on shaft 20 and is biased in a clockwise engaging direction by spring 21. This brake-member 18 is adapted to be periodically lifted out of engagement with the brake surface 16 by engagement between roller 22 of brake 18 and a raised portion 23 on cam 24 that is mounted on, for rotation with, a shaft 25 which is driven through suitable gearing by a constant speed motor 26.

Pivotally mounted on shaft 12 in front of the yoke 13 is a curved arm 27 that is in frictional engagement with the yoke. This arm extends upwardly above shaft 12 and forwardly where it is joined integrally with an index pointer 28. The lower end of arm 27 has a pin 29 projecting therefrom. The arrangement is such that for any desired setting of the index pointer 28, the pin 29 assumes a corresponding position.

A control lever is set in accordance with the relative positions of the pins 15 and 29 respectively on the plate 14, connected to move in accordance with the present value of the condition, and arm 27, that is adjusted to a position corresponding with a desired value of the condition. To this end, an arm 30 is provided and has on one side of its lower end a straight edge 31. This arm 30 also has formed in its lower end a notch 33 that slidably receives a pin 32 on the end of a curved lever 34 that is pivoted for movement around a stud shaft 35. The shaft 35 is mounted in the frame of the casing above the shaft 12. The lever 34 has a pin 36 projecting from it that is received by a notch 37 in the end of a lever 38 that is also pivoted on the shaft 20. This lever 38 is biased in a counter-clockwise direction by a spring 39 and is periodically moved in a clockwise direction by engagement between a roller 40, mounted on an arm 41 adjustably fastened to lever 38, and cam 42, mounted on shaft 25. The arm 30 is pivotally connected at 43 to a control lever 44, which is in turn pivoted at 45 on an extension of the yoke 13. Movement of this control lever 44 about its axis thereby causes bodily movement of arm 30, and in a like manner, movement of arm 30 will cause pivotal movement of control lever 44. Attached to the lower end of the control lever is a strip of insulating material 46 to which is attached a contact member 47 that is adapted to be moved to a point along the length of an electrical resistance 48 corresponding to the position at the time of pen 11. Resistance 48 is mounted on an arm 49 in the casing and is in the form of a helically wound coil which forms a part of an electrical proportioning system to be later described.

Movement of the contact member 47 along the resistance 48 is accomplished in the following manner: As cams 24 and 42 are rotated in a counter-clockwise direction by motor 26, the raised portion 23 of cam 24 will come under roller 22 to lift the brake edge 19 from brake surface 16, thus permitting the pen 11 and plate 14 carrying pin 15 to assume a position in accordance with the then value of the temperature of bulb 6 as measured by helix 8 and link 17. (See Fig. 1.)

Continued rotation of the cam 24 will permit the brake to be again applied to surface 16 and will slowly bring the low portion of cam 42 over roller 40, thus permitting arm 41 and its mounting lever 38 to turn in a counter-clockwise direction under the influence of spring 39. Such a movement of lever 38 will, through slot 37 and pin 36, move the curved lever 34 in a clockwise direction, and thus the pin 32 on lever 34 will move arm 30 to the left around its now stationary pivot 43, by its engagement with slot 33. As the low portion of cam 42 continues over roller 40, the arm 30 will continue its movement to the left until edge 31 thereof contacts either pin 29 or pin 15. Upon such a contact, the arm 30 will be tilted until it engages the other of the pins 29 or 15 and, during the tilting, move its pivot 43 on the upper end of lever 44, to move the lever 44 about its pivot 45 and change the position of contact 47 along resistance 48. If the value of the temperature being measured has not been changed from that of the preceding cycle, the two pins 15 and 29 will be contacted at the same time, and there will be no movement of lever 44. If, however, the value of the temperature has, for example, risen, the plate 14 carrying pin 15 will have moved in a clockwise direction, and edge 31 will first engage pin 29 and then pin 15. This will cause a movement of arm 30 in such a direction that lever 44 will be rotated in a counter-clockwise direction to move contact 47 toward the right or upper end of resistance 48. In a like manner, a decrease in the value of the temperature from that of the preceding cycle will cause lever 44 to be moved clockwise to bring contact 47 nearer the left or lower end of resistance 48. The position of the parts when arm 30 has contacted the pins 15 and 29 is shown in Fig. 2, and continued rotation of the cams will bring the parts again to their positions of Fig. 1, in which the brake 17 is released from surface 16 and arm 30 is in its furthermost right-hand position.

A change of the position of the control point index 28, which may be effected by grasping and turning the index in the proper direction, or by the addition of a link and adjusting lever and knob, as is well known, will cause a corresponding change of position of pin 29; and that will in turn alter the position of pin 15 at which the contact 47 will be disposed mid-way along resistance 48. In other words, pins 15, 29 and 43 will be disposed on a line radially of the axis of shaft 12 when pen 11 is at the control point and regardless of the position of pin 29 and index 28. This means, of course, that when pen 11 and index 28 coincide, regardless of the point in the scale at which this occurs, pin 43 will be coaxial with shaft 12, and contact 47 will be at the mid-point of resistor 48. With any position of index 28, on a deviation of the pen to one side or the other of the index, which establishes its control point, contact 47 will be deflected in the corresponding direction and by an amount depending upon the extent of pen deflection from normal.

At times, it may be desirable to change the throttling range of the instrument, that is the percentage of movement of the control element through its full scale for a given pen movement. This can be accomplished by radially adjusting either of the pins 15 or 29 with respect to the other and thereby changing the angular position of members 30 and 44 for a given setting of the pins. A manner of accomplishing this is shown in Fig. 3A in which the pin 29, instead of being mounted on the arm 27, is attached to the lower end of a link 112 whose upper end is pivoted to an arm 113 that is in turn pivoted at 114. The pin 29 extends through a slot 115 that is formed in arm 27 and is radial to its axis in any position of adjustment. As the index 28 is moved, the slot 115 will be moved and carry pin 29 along with it to the control point. Then by turning a disc 116, that is fastened to and moves with the arm 113, the pin 29 can be adjusted along slot 115 to vary the throttling range of the instrument. It can be readily seen that at any position of the pen other than when it is at the control point, the arm 30 and lever 44 will be moved to different positions for different radial adjustments of the pin 29.

Angular adjustments of contact 47 along resistance 48 control the adjustment of the heater supply valve 4 and gives the latter adjustment movements proportional to the adjustment movements of contact 47. The proportioning means comprises a portion forming a part of the control instrument and located within the instrument casing 1 and a larger portion external of the casing, and connected to the instrument portion only by electrical conductors extending through the instrument casing wall. The portions of the proportioning system within the instrument casing are the contact 47 and the resistance 48. Conductors 50 and 51 are connected to the ends of the resistance conductor 48, and a conductor 52 is connected to the switch or contact 47. The conductors 50, 51, and 52, are conveniently included in a single cable extending through a part 53 mounted in an opening in the instrument casing body, such as is customarily employed in instruments having casing enclosed parts electrically connected to external apparatus.

Externally of the instrument casing, the conductors 50 and 51 are connected to the ends of a resistance 54, curved in a circle about the axis of a rotatable shaft 55 carrying a contact or switch arm 56 engaging the resistance 54 at different points along the length of the latter as the angular position of the shaft 55 is adjusted. The resistances 48 and 54, conductors 50, 51, and 52, and contacts 47 and 56, form parts of a Wheatstone bridge arrangement which is energized by a transformer 57, the terminals of the secondary winding of that transformer being connected by conductors 58 and 59 to the conductors 50 and 51, respectively. The terminals of the primary winding of the transformer 57 are connected to alternating current supply conductors 60 and 61, which may form a part of any available alternating current supply system of customary commercial voltage for lighting and power purposes.

As diagrammatically shown, the shaft 55 is the armature shaft of a reversing motor including a rotor 62 and cooperating winding 63, and a second rotor 64 and cooperating winding 65, the shaft 55 being rotated in one direction when the winding 63 is energized, and in the opposite direction when the winding 65 is energized, as hereinafter described. One terminal of the winding 63 is connected through a limit switch 66 and a conductor 67 to the bridge conductor 51, to which one terminal of the winding 65 is also connected through the conductor 67 and a limit switch 68. The second terminal of the winding 63 is connected to a switch contact 69, and the second terminal of the winding 65 is connected to a switch contact 70. A pivoted switch member 71, connected by a conductor 72 to the bridge conductor 50, is movable between one end position in which it engages the contact 69, and thereby connects the winding 63 between the bridge conductors 50 and 51, and a second end position in which it engages the contact 70, and thereby connects the winding 65 between the bridge conductors 50 and 51.

The switch 71 forms part of a proportioning relay, comprising an armature 73 connected to the switch 71, so as to oscillate the latter when the armature 73 is given longitudinal reciprocating movements. It is given such movements by changes in the relative values of the currents flowing in the coils 74 and 75, which are arranged end to end and in inductive relation with the armature 73. The coils 74 and 75 are connected in series with one another between the conductors 50 and 51, and their adjacent terminals are connected by a conductor 76 to the bridge conductor 52.

In any condition of stable operation, the currents flowing through the relay coils 74 and 75 will be equal, and the armature 73 and the switch 71 will each be in its neutral position. Any deflection of the lever 44 and contact 47 will make the currents flowing through the coils 74 and 75 unequal, and will result in an operation of the reversing motor which will adjust the contact 56 as required to rebalance those currents. For example, on a deflection of the contact 47 in the clockwise direction, corresponding to a decrease in the temperature of the bulb 6 below its normal value, the current flowing through the relay coil 75 will be increased relative to the current flow through the coil 74. In consequence, the armature 73 will be shifted to the right, bringing the pivoted switch 71 into engagement with the contact 70, and thereby energizing the motor winding 65. The rotor 64 will then rotate the shaft 55 in the counterclockwise direction until the resultant movement of the contact 56 makes the sum of the portion of the resistance 54 between the contact 56 and the conductor 51 and in the portion of the resistance 48 between the contact 47 and the conductor 50, equal to the sum of the other portions of the resistances 48 and 54, whereupon the currents flowing through the relay coils 74 and 75 will be again equalized, and the armature 73 will be returned to its mid-position. Any adjustment of the contact 47 in either direction, thus produces a corresponding proportional adjustment of the contact 56 in one direction or the other.

The switches 66 and 68 are actuated by the rotation of the shaft 55 to perform the usual limit switch function of preventing over-travel of the armature shaft in either direction, which would carry the contact 56 beyond the corresponding end of the resistance. As such motor limit switches are in common use, there is no occasion to illustrate or describe the connections through which the switches 66 and 68 are actuated by the shaft 55. As diagrammatically shown, the shaft 55 carries a worm 77 engaging the teeth of the worm gear segment 78 mounted on the operating shaft of the fuel valve 4, so that the latter is angularly adjusted in the opening or closing direction as the lever 44 deflects clockwise or counter-clockwise, respectively, from its neutral position.

As shown, branch conductors 79 and 80, from the supply conductors 60 and 61, form the energizing conductors for the motor 26 and are included in a cable passing through the part 53. The latter is also formed with a passage for the tube 7 connecting the thermometer bulb to the helix 8.

The form of the apparatus shown in Fig. 4 is used to actuate a proportioning system just as does that form of the invention shown in Figs. 1 to 3. This form differs, however, from that of Fig. 1 in the manner in which the mechanical relay moves contact 47 along resistance 48. Referring now to Fig. 4, the shaft 12 is supported in a yoke similar to yoke 13 of Fig. 1, although it is not here shown for the sake of clearness. Mounted on this shaft is a triangular plate 81 to which is connected the link 17 which is moved by helix 8 in accordance with variations in the temperature of bulb 6. The lower edge of plate 81 is formed concentric to shaft 12 and acts as a brake surface 82. Attached to the right edge of the plate 81 is an adjustable plate member 83 formed generally in the shape of a triangle with its apex coinciding with a corner of plate 81. The plate 83 is adjustable with respect to plate 81 in an arcuate manner with its apex as the axis of adjustment and is held in its adjusted positions by screws 84.

Back of plate 81 is a control plate 86 which may also be turned about shaft 12 as an axis and has at its lower end a flat edge 87. The plate 81 is connected to pen 6 and plate 86 is connected to index 28 in a manner similar to the connections between the pen and plate 14 and the index and lever 27 in Fig. 1, although for the sake of clearness, these connections are not shown in Fig. 4.

Extending rearwardly from control plate 86 are pins 88 upon which is slideably mounted a member 89, the pins extending through slots 90 in the member. The member 89 is normally biased in a downwardly direction by a spring 91 whose lower end rests against a backwardly extending ledge 92 on member 89 and whose upper end abuts a plate 93 extending from the back of the casing. This spring 91 is supported axially by a rod 94 which extends through it and has its lower end attached to the ledge 92, and upon whose upper end is a rearwardly extending plate member 95. The member 89 is periodically lifted in an upward direction by a lever 96 pivoted at 97, one end of which extends under the plate 95, and the other end of which has attached thereto a link 98. The lower end of link 98 is connected to a lever 99 which is pivoted at 100 and is biased in a counterclockwise direction by spring 101. The lever 99 is periodically moved clockwise by a cam 102 mounted on shaft 103 that is driven at a constant speed by motor 26. The link 98 has attached to it and extending forwardly therefrom two abutment members 104 and 105 that serve to apply and release a brake-member 106, pivoted at 107, to the brake surface 82 of plate member 81. Upon downward movement of link 98, spring 108, between member 104 and the upper edge of the brake, will apply the brake to surface 82, and upon upward movement of link 98, the brake will be released by member 105.

Pivoted to the member 89 at 109 is a T-shaped lever 110 that carries at its lower end the contact 47 which is adapted to move along resistance 48. On each end of the cross-piece of lever 110 is a forwardly projecting arm that has on the front thereof knife edges 111 and 112 that are adapted to engage respectively surface 85 of plate 83 and surface 87 of plate 86.

In the operation of this modification, rotation of the cam 102 from the position shown will permit lever 99 to rise, which in turn forces link 98 upwardly until member 105 engages the brake 106 to release it from the edge 82. This frees plate 81 from any restraint and allows it to move to any position dictated by helix 8 and the then value of the temperature of bulb 6. Upward movement of link 98 also, through lever 96, permits member 89 and its attached lever 110 to move downwardly under the bias of spring 91. Continued rotation of cam 102 will move lever 99 clockwise and cause link 98 to move downwardly to apply brake 106 to edge 82 by means of member 104 and spring 108. Downward movement of link 98 also moves lever 96 counter-clockwise, which in turn pulls rod 94 and member 89 upward. As member 89 moves upward carrying with it the T-shaped lever 110, the knife edges 111 and 112 will engage surfaces 85 and 87. If the temperature value is the same this cycle as it was during the preceding cycle, then the knife edges will engage their respective surfaces simultaneously, and there will be no resulting relative movement of contact 47 and resistance 48. If, however, the temperature has risen since the preceeding cycle, plates 81 and 83 will have moved to the left from their previous position, with the result that as member 89 and lever 110 rise, the knife edge 112 will first engage surface 87 to move lever 110 counter-clockwise until knife edge 111 engages surface 85. This results in a movement of contact 47 toward the right end of resistance 48. If the temperature of bulb 6 is lower than it was during the preceding cycle, plates 81 and 83 will move to the right, so that upon upward movement of member 89 and lever 110, the knife edge 111 will first engage surface 85 to move lever 110 clockwise until knife edge 112 engages surface 87. This causes a movement of contact 47 to the left along resistance 48.

By adjustment of the plate 83 relative to plate 81, the amount of movement of the contact 47, in response to a given deflection of the pen, may be governed. Such an adjustment is sometimes referred to as a throttling range adjustment.

As in the modification of Figures 1 to 3, any movement of contact 47 along resistance 48 in this modification will cause a corresponding energization of the proportioning motor field 62 or 64 to rebalance the Wheatstone bridge circuit of the proportioning system and change the opening of valve 4 supplying fuel to the heater 5.

It will thus be seen from the above-detailed description that I have provided an efficient mechanical relay system, which through any deflection of the measuring element will utilize an auxiliary source of power to effect an adjustment of a control device to change the value of the condition being measured in accordance with its variations.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a control instrument, a proportioning system for adjusting the value of a condition to be controlled, a part set in accordance with a desired value of the condition, a device set in accordance with the value of the condition, a member adapted to be moved into engagement with said part and device and be positioned thereby, and means to adjust said proportioning system in accordance with the position of said member.

2. In a control instrument, a part movable around an axis, a device movable around said axis and spaced from said part, a lever movable around another axis and having a member pivoted thereto, means for moving said member into engagement with said part and said device, to thereby adjust said member and lever to a position in accordance therewith, a contact carried by said lever and a resistance over which said contact is adapted to move, whereby as said lever moves, said contact will be adjusted along said resistance.

3. In a control instrument, a part positioned in accordance with a desired value of a condition, a device positioned in accordance with changes in the value of said condition, a brake for periodically holding said device in position, a member adapted to be moved into engagement with said part and said device while said device is held in position, a proportioning system for controlling said condition, and means to adjust said proportioning system from the movements of said member.

4. In a control instrument, a first deflectable part, a second deflectable part, a single member adapted to engage said parts, an arm connected to said member and adapted to actuate the latter for engagement with said parts, to thereby position said member in accordance with the relative positions of said parts, a lever pivoted to said member and moved thereby into a position varying with the position of said member, and means cooperating with said lever to control a variable condition.

5. In a control instrument, a pivoted lever, a contact carried by said lever, a resistance over which said contact is adapted to move, a member pivoted to said lever, means for moving said member, and thereby said lever, to a position proportional to the difference between a desired value of a condition to be controlled and the present value of said condition, and means to control said condition by movement of said contact along said resistance.

6. In a control instrument, a part indicating a desired value of a condition, a device indicating the present value of said condition, a member, means for moving said member into engagement with said part and said device to thereby position said member proportionally to the displacement of said device from said part, a pivoted lever pivoted to and moved by movement of said member, a valve to regulate said condition, and means to adjust said valve in accordance with movements of said lever.

7. In a control instrument, a pin adjustable about an axis in accordance with the variations in a variable condition, a second pin independently adjustable about said axis in accordance with the desired value of said condition, a pivoted control lever, a member adapted to engage said pins and pivoted to said lever at a point which coincides with said axis when said member contacts said pins, and at that time, said pins are disposed on a line radially of said axis, and means adapted to cause engagement of said member, and pins moving said point from said axis in one direction or the other when said pins are not disposed on a line radially of said axis, and thereby adjusting said control lever responsively to the variation of said condition from the desired value thereof.

8. The combination of claim 7 in which the last-mentioned means includes a pivoted lever adapted to engage said member and cam means to actuate said lever.

9. The combination of claim 7 and braking means adapted to periodically hold said first-mentioned pin against movement when engaged by said member.

10. In a control instrument, a device responsive to the value of a condition and movable about an axis, a part also movable about said axis to a position corresponding to that of a desired value of said condition, an arm pivoted above said axis and movable between said part and device, a member adapted to contact said part and device and connected to said arm, means for moving said arm, and through said arm, said member into and out of engagement with said part and said device, a lever to which said member is attached whereby movement of said member moves said lever, and means for controlling said condition by movement of said lever.

11. In a control instrument, a control valve, a proportioning system for adjusting said valve, a lever having a contact thereon for adjusting said proportioning system, means for adjusting said lever in accordance with the deviation of the value of said condition from a desired value thereof, said means consisting of a part positioned in accordance with the desired value of said condition, a device positioned in accordance with the present value of the condition, a member attached to said lever and means to move said member into engagement with said part and device to thereby adjust said lever.

COLEMAN B. MOORE.